United States Patent [19]
Schuster et al.

[11] 4,158,614
[45] Jun. 19, 1979

[54] METHOD FOR SEPARATING GASEOUS MIXTURES OF MATTER

[75] Inventors: Eberhard Schuster; Arno Kersting, both of Erlangen, Fed. Rep. of Germany

[73] Assignee: Kraftwerk Union Aktiengesellschaft, Mülheim, Fed. Rep. of Germany

[21] Appl. No.: 787,444

[22] Filed: Apr. 14, 1977

Related U.S. Application Data

[63] Continuation of Ser. No. 573,071, Apr. 30, 1975, abandoned.

[51] Int. Cl.² .............................................. B01J 1/10
[52] U.S. Cl. ..................... 204/157.1 R; 204/DIG. 11
[58] Field of Search ................................ 204/DIG. 11

[56] References Cited
U.S. PATENT DOCUMENTS
3,951,768  4/1976  Gurs ........................... 204/DIG. 11

Primary Examiner—Howard S. Williams
Attorney, Agent, or Firm—Kenyon & Kenyon

[57] ABSTRACT

Molecules to be separated from a mixture of matter of a chemical component are excited in a manner known per se by narrow-band light sources, and a chemical reaction partner for reacting with these molecules is admixed while supplied with energy by electromagnetic radiation or heating, and as additionally required for making chemical reactions possible.

7 Claims, 4 Drawing Figures

METHOD FOR SEPARATING GASEOUS MIXTURES OF MATTER

This is a continuation of application Ser. No. 573,071 filed April 30, 1975 now abandoned.

BACKGROUND OF THE INVENTION

The present invention concerns a method for chemically separating gaseous mixtures of matter and particularly isotopes, using laser beams to make possible a directed chemcial reaction of a mixture component, with a chemical reaction partner.

It is known that molecules which are composed of at least two different elements, absorb electromagnetic radiation in the infrared region. The infrared absorption spectra reflects the structure of the molecules, and are caused by the energy transitions of the rotation-vibrational states. As the vibration energy of a molecule depends greatly on the mass of the participating atoms, molecules which contain one kind of element with different isotopes, also have different spectra-scopically detectable absorption lines.This difference in infrared absorption can be used for isotope separation or more generally speaking, for the separation of matter, if the infrared emission line of a laser is brought into resonance with the rotation vibration line of the respective molecule of the kind of atom to be separated, so the molecule is excited thereby. The molecule excited in this manner can then be made to react from its higher energy level thus imparted, with suitable partners. In other words, the absorption of a light quantum by such a molecule constitutes a supply of energy which, with regard to the initiation of certain chemical reactions, has a similar effect as, for instance, an increase in temperature.

According to this principle, a mixture of methanol and deuterized methanol has already been separated by bromination of the normal methanol, for which see "Applied Physics Letters", vol. 17, no. 12, pages 516 to 519. According to the same principle, the separation of uranium isotopes in furthermore proposed in the (German) Offenlegungsschrift No. 1,959,767 of June 3, 1971.

The implementation of this known method for isotope separation, however, hangs on three conditions; first, laser arrangements must be available which can be tuned to the desired molecular vibration frequencies; secondly, the energy of this radiation must be great enough to that the chemical reaction can be released, and third, the reaction partner must be chosen so that a separation of the newly generated mixture of matter in a reaction apparatus is possible. However, as in the infrared region the energy which can be supplied, for instance by means of lasers, is relatively small, the feasibility of the above known method is very limited.

The problem therefore exists to further develop this known method in such a way that such energy limitations are less important.

SUMMARY OF THE INVENTION

According to the invention, a solution of the above problem is achieved by exciting the molecules of the matter to be separated in the manner known per se by means of narrow-band light sources, and by supplying to the other reaction partner additional energy as required to make the chemical reaction possible. Contrary to the method described previously, energy is supplied therefore to the reaction partner required for the chemical reaction, in a different manner to make the deisred chemical reaction possible. This amount of energy is here apportioned so that only excited molecules of the one isotope react with this reaction partner, but not the unexcited molecules of the other isotopes or substances. To obtain the highest possible separation yield, the reaction partner should here be present in excess, so that the molecular impacts necessary for the chemical reaction, take place more between the reaction partners and less between the molecules of the mixture of isotopes or matter. In the latter case, the energy supplied would largely get lost for the separation effect and the separation effect itself would become poorer.

The additional energy for the reaction partner can be supplied in different ways, e.g., by heating it before it is introduced into the separation chamber or by supplying energy within the separating device by means of lasers, infrared light sources, ultraviolet light sources etc.

Although the feasibility of this method of separation is not limited to specific mixtures of isotopes or matter, its particular importance is in the field of nuclear technology. Here, it is particularly the separation of the uranium isotopes U 238 and U 235, such as is required for the enrichment of the nuclear fuel with fissionable uranium 235 for the different reactor types to different degrees. The methods used heretofore of gas diffusion or the ultracentrifuge require extremely large technical means and in addition, consume an extremely large amount of energy. These drawbacks are no longer inherent in the method according to the invention.

As already mentioned, a suitable reaction partner is also necessary for carrying out this method. For the separation of the uranium isotopes, the following reactions can be used, for instance, from which the starting partners as well as the chemical reaction partners can be seen:

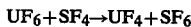
$$UF_6 + SF_4 \rightarrow UF_4 + SF_6$$

or

$$2\ UF_6 + SiCl_4 \rightarrow 2\ UF_4 + SiF_4 + 2\ Cl_2$$

or

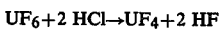
$$UF_6 + 2\ HCl \rightarrow UF_4 + 2\ HF$$

or

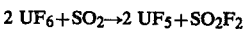
$$2\ UF_6 + SO_2 \rightarrow 2\ UF_5 + SO_2F_2$$

As a further example from nuclear reactor technology, the separation of boron isotopes should be mentioned, with the following chemical reaction:

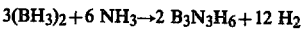
$$3(BH_3)_2 + 6\ NH_3 \rightarrow 2\ B_3N_3H_6 + 12\ H_2$$

All these reactions proceed normally only at elevated temperature. Through the specific excitation of definite uranium or boron isotopes, the chemical reaction takes place only between the latter; the other isotope compounds remain untouched.

BRIEF DESCRIPTION OF THE DRAWINGS

The accompanying drawings schematically illustrate examples of apparatus for carrying out the present invention, the various figures being as follows.

DETAILED DESCRIPTION OF THE INVENTION

The apparatus illustrated by these drawings is described hereinafter. First, however, some data on the method is given below.

For the reaction $UF_6 + 2\ HCl \rightarrow UF_4 + 2\ HF + Cl_2$, mentioned as an example, a tunable Raman spin-flip laser (RSF laser) which is pumped with a CO laser can be used to excite the $UF_6$. This laser is tuned to one of the absorption bands of the $UF_6$ which lie between 5.2 and 6.4 $\mu m$. The remaining energy required for the reaction partner HCl is added by exciting this molecule at 3.46 $\mu m$ by means, for instance, of a tunable dye laser.

In a similar manner, the excitation for carrying out the already mentioned boron reactions is carried out. For exciting the diborane, an RSF laser is again used and adjusted to the absorption bands of the diborane at 5.4 or 6 $\mu m$. The absorption band of ammonia is at 3 $\mu m$, and the required remaining energy is additionally supplied through excitation by means of an appropriate frequency, by a tunable dye laser.

The separation of the uranium isotopes according to the reaction $UF_6 + SF_4 \rightarrow UF_4 + SF_6$ can take place, for instance, through excitation of the 235 $UF_6$ molecule with a tunable power laser, e.g., a CO laser, at a rotation vibration line situated between 5 and 6 $\mu m$. The remaining energy in the reaction partner $SF_6$ is supplied by heating the same to about 300° C. prior to its introduction into the separation chamber.

The total pressure of the reaction partners when effected in a separation chamber should be between $10^{-2}$ and 760 Torr, and preferably between 1 and 100 Torr. The temperature of the separation chamber may here be between $-50$ and $+200°$ C., but preferably at room temperature.

As for the evaluation of such a separation method, a knowledge of the energy required is of importance; it might be mentioned that including losses that occur, about 300 kilowatthours of electric energy are required for the separation of 1 kg U 235.

Figure 1:
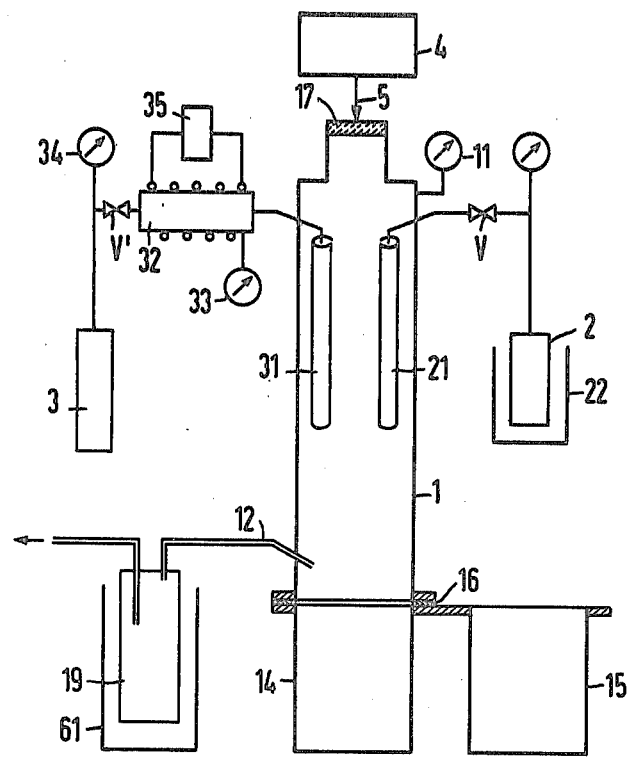
FIG. 1 in vertical section shows a vertical apparatus using heat to provide the previously-referred-to additional energy.
Figure 2:
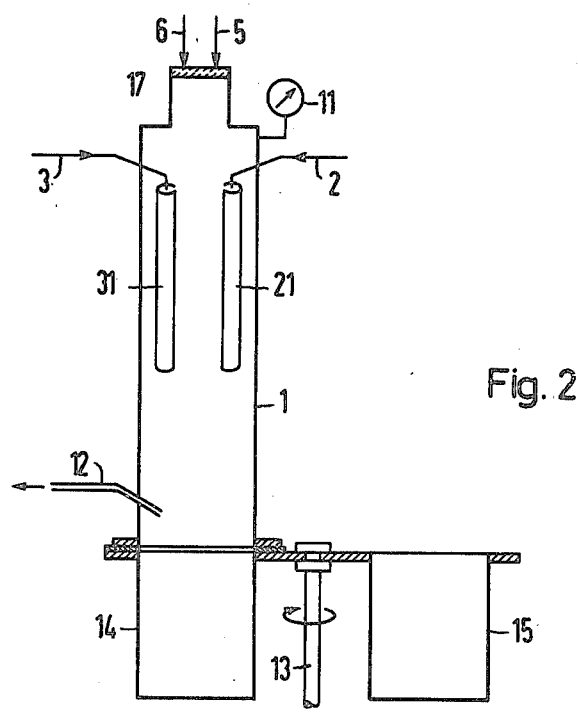
FIG. 2 shows such a vertical apparatus, also in vertical section, but using electromagnetic radiation to supply the additional energy.
Figure 3:
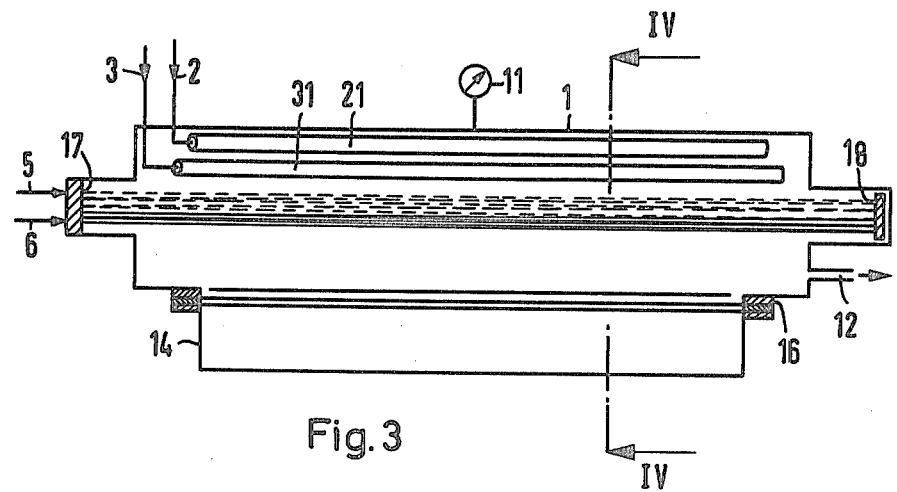
FIG. 3 is like FIG. 2 but showing a horizontal form.

In FIG. 1 to 3, three different embodiment examples of separation apparatus are shown schematically, which operate according to the principle described. Functionally corresponding components are provided here with the same reference numerals.

FIG. 1 shows apparatus in which the necessary additional energy is supplied to the reaction partner in the form of heat. This apparatus consists, first, of a reaction tube 1 which is provided at its bottom with horizontally movable collecting tanks 14 and 15 for the separated matter. A "Teflon" washer 16 is provided in a manner known per se for sealing so one tank can be slidably replaced by the other. At its top end, the reaction vessel 1 is closed off by a radiation-permeable disc 17, for instance, of $BaF_2$. Outside of this disc there is provided in the axial direction a highpower laser 4, whose radiation enters into the reaction chamber through the disc or window 17. The mixture of matter or isotopes to be separated is in a tank 2 which is held at constant temperature by a thermostat-controlled enclosure 22, and is conducted into the reaction chamber via a valve V and suitable pipe lines. A manometer 11 serves for monitoring the pressure in the reaction chamber. In the reaction chamber, the mixture of substances is introduced through a, for instance, elongated, side-slotted nozzle 21, while the laser beam 5 passes through the mixture. Opposite the side-slotted nozzle 21, a similar nozzle 31 is arranged, which is fed with the reaction partner taken from a supply device 3. Before entering the nozzle, the reaction partner flows through a valve V', as well as a heating arrangement 32 in the form of a tube oven which is electrically heated and equipped with a temperature controller 35 and a temperature measuring device 33. Manometers 34 and 34' are provided for measuring the supply pressures. When the gaseous substances meet in the reaction chamber, the already described reaction takes place; the substance to be separated or the isotope to be separated reacts chemically with the fed-in reaction partner 3 and with it, produces a new compound which precipitates normally in solid form, in one or another of the collecting tanks 14 and 15. The exhaust gases, consisting of the unused shares of the substances of the fed-in mixture 2, the excess of reaction partner 3 and reaction products that do not contain uranium, get into the cooling trap 19 via the line 12. The cooling trap serves here for the precipitation of the reaction partners and may be formed by a Dewar vessel 61. To control the pressure in the reaction chamber 1, the manometer 11 is provided and a control arrangement, not shown, serves to keep the desired pressure constant.

The apparatus shown in FIG. 2 corresponds essentially to FIG. 1 with the difference that the additional energy is supplied to the reaction partner 3 via a laser or via another light source 6, through the window 17. The collecting tanks 14 and 15 are arranged here not laterally movably, but rotatably about an axis 13. The elements not shown correspond to those of FIG. 1. The length of the slotted nozzles is here several meters, so that an amount as large as possible of the reaction partners is exposed to the radiation 5 and 6. Because of the precipitation of the solid reaction products, the arrangements according to FIGS. 1 and 2 show a vertical structure.

In contrast thereto, the arrangement shown in FIG. 3 is horizontal. The radiations 5 and 6 entering on the left side via the window 17 are reflected by a mirror 18 at the other end of the reaction chamber 1 and thus passes through the reaction partners entering via the slotted nozzles 21 and 31, at least twice. If such optical foldback of the light path through mirrors 18 is provided, a considerable improvement of the efficiency is obtained through multiple reflection of the rays 5 and 6. This also permits a considerable shortening of the overall apparatus.

Figure 4:
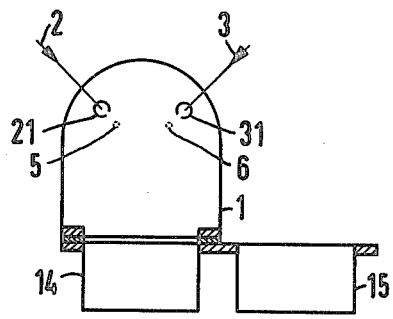
FIG. 4 is a cross section taken on the line IV—IV in FIG. 3.

The collecting tanks 14 and 15 for the reaction products are arranged here below the horizontally arranged slotted nozzles 21 and 31, whose mutual relation can be seen, for instance, in the side figure 4a.

Still further variants in the design of such apparatus are possible, of course. Also, other combinations regarding the feeding-in of the additional energy for the reaction partner may be advantageous.

In conclusion, it should be pointed out once more that this separation method in suited also for mixtures of normal substances, i.e. not only for mixtures of isotopes, particularly if separation by purely chemical or physical means presents considerable difficulties.

What is claimed is:

1. A method for chemically separating isotopes from a mixture of gaseous matter formed by mixed isotopes and a chemical reaction partner, by a reaction directed by a light beam projected through the mixture with the light beam having a narrow band of wave lengths molecularly exciting mainly the isotope to be separated and thereby promoting its reaction with the reaction partner, wherein the improvement comprises supplying the reaction partner with addition energy to a degree substantially reducing the energy of the light beam required to promote said reaction in the absence of the addition of the energy to the reaction partner.

2. The method of claim 1 in which electromagnetic radiation is projected through said mixture to add the energy to the reaction partner.

3. The method of claim 2 in which the wave length of said radiation is substantially the same as the molecular resonance frequency of the reaction partner.

4. The method of claim 1 in which said mixed isotopes are $^{10}B$ and $^{11}B$ and said gaseous matter is $(BH_3)_2$, and the reaction partner is $NH_3$, said band of wave lengths is from 5.4 to 6 $\mu m$ and a light beam having a wave length of about 3 $\mu m$ is projected through the mixture to molecularly excite said reaction partner and provide it with said addition energy.

5. The method of claim 1 in which said mixed isotopes are 235 $UF_6$ and 238 $UF_6$ and said reaction partner is selected from the class consisting of $SF_4$, $SiCl_4$, $HCl$ and $SO_2$ and the mixture is contained in a separation chamber into which the laser beam is projected, the beam having a wave length between 5.2 and 6.4 $\mu m$ molecularly exciting the 235 $UF_6$, the mixture being formed in said chamber by separately introducing the mixed isotopes and reaction partner into the chamber with the reaction partner excited by addition energy at least while in the chamber.

6. The method of claim 5 in which the reaction partner is heated to about 300° C. prior to said introducing, to provide it with said addition energy.

7. The method of claim 5 in which electromagnetic radiation is projected into said chamber to provide the reaction partner with the addition energy.

* * * * *